LOW LEVEL THRESHOLD DETECTOR WITH TEMPERATURE COMPENSATION

Original Filed June 1, 1962

INVENTOR.
ROBERT C. BULLENE
BY Hardy & Gallacher
ATTORNEYS

United States Patent Office 3,299,296
Patented Jan. 17, 1967

3,299,296

LOW LEVEL THRESHOLD DETECTOR WITH TEMPERATURE COMPENSATION

Robert C. Bullene, Marion, Iowa, assignor to Collins Radio Company, Cedar Rapids, Iowa, a corporation of Iowa Continuation of application Ser. No. 200,030, June 1, 1962. This application Nov. 12, 1964, Ser. No. 412,584
9 Claims. (Cl. 307—88.5)

This is a continuation of application Serial Number 200,030, filed June 1, 1962, by Robert C. Bullene, now abandoned.

This invention relates in general to a switching circuit, and in particular to a trigger circuit which switches from a first state of conduction to a second state on the application of a signal voltage and returns to the initial condition when the signal voltage falls below a preset level.

It is often desirable to indicate the presence or absence of a signal, as, for example, a direct current voltage, and the present invention is capable of producing an output by switching a transistor circuit from a first to a second conductive state on the application of a direct current signal. It is also capable of being adjusted so as to switch back to the initial condition when the signal voltage falls below a preset level.

It is a feature of this invention to provide a switching circuit of great sensitivity which is temperature compensated by a novel circuit so as to allow the voltage level adjustments to remain substantially constant with variations in temperature.

It is an object of this invention to provide for a switching circuit capable of switching from a first to a second condition on the application of a signal. Another object of this invention is to provide a temperature compensating circuit for a switching device.

Further objects, features, and advantages of the invention will become apparent from the following description and claims when read in view of the drawings, in which:

Figure 1:
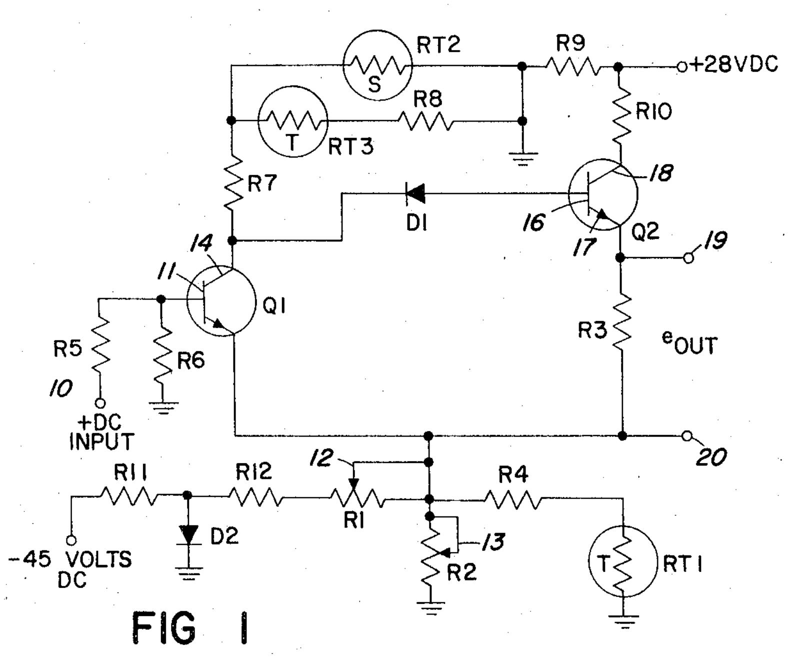
FIGURE 1 is a schematic view of the switching circuit of this invention.

FIGURE 1 illustrates an input terminal 10 to which may be connected a positive direct current voltage. The input terminal 10 is connected to the base 11 of a transistor Q1 through resistor R5. Resistor R6 is connected between base 11 and ground. The emitter of transistor Q1 is connected to movable contacts 12 and 13 which engage, respectively, resistors R1 and R2. One end of resistor R2 is connected to ground. Resistor R1 is connected in series with resistor R12 through a diode D2 to ground. Resistor R12 is also connected through resistor R11 to a negative direct current bias supply which for illustrative purposes is shown in the drawing as being minus 45 volts direct current.

A resistor R4 is connected to the emitter of transistor Q1 and is in series with a thermistor RT1 which has its other side connected to ground. The collector 14 of transistor Q1 is connected to the base 16 of a second transistor Q2 through a diode D1.

The emitter 17 of transistor Q2 is connected to a resistor R3 which has its opposite side connected to movable contacts 12 and 13. The collector 18 of transistor Q2 is connected through a resistor R10 to a positive bias source.

A temperature compensating circuit is connected between the collector 14 and 18 of transistors Q1 and Q2 and comprises a resistor R7 which is connected to the parallel circuit consisting of a thermistor RT3 which is in series with a resistor R8 and a sensistor RT2. A resistor R9 is connected between resistor R10 and the parallel circuit of sensistor RT2 and the thermistor RT3 and resistor R8. The junction point between the resistors R8 and R9 is connected to ground. A pair of output terminals 19 and 20 connected cross resistor R3.

There are a variety of semiconductor positive action circuits now in use that operate at various signal levels and voltage inputs. Devices such as trigistors, unijunction transistors, silicon controlled rectifiers and transistors have been used in a variety of circuits. Despite the numerous designs, none has a positive action that will trigger at low level positive direct current and return to the original state at a direct current level above zero. A low level direct current detector at lower voltage levels is very difficult to temperature stabilize due to the inherent characteristics of transistors.

A circuit which has a positive action and is temperature compensated is shown in FIGURE 1. Under "no signal" condition, Q1 is cut off and Q2 is conducting at saturation. This state may be designated "Mode 1." When a positive direct current signal is applied at the input of Q1, the circuit snaps to another mode of operation (Mode 2). In this mode, Q1 is conducting and Q2 is cut off. Lowering the signal voltage to a previously adjusted level will cause the circuit to revert to its original state.

The adjustment of signal voltage at which the circuit snaps to Mode 2 is made with contact 12 on R1; the adjustment of signal voltage at which the circuit returns to Mode 1 is made with contact 13 on R2. The adjustment of R1 simply changes the bias voltage on the emitter of Q1, and therefore changes the threshold signal level. The common resistance for both emitters determines the signal differential voltage between Mode 1 and Mode 2. Due to circuit current flow in the common emitter resistance, the voltage differential decrease as the emitter resistance decreases.

The thermistors RT1 and RT3 and sensistor RT2 push the ambient operating temperature from 0° C. to near 80° C. with very little change in direct current threshold. The largest share of the compensation is due to RT2 and RT3. The temperature compensation network shown in FIGURE 2 has the associated compensation curve shown in FIGURE 3.

This is the direct curve, since the leakage current of transistors increases exponentially with temperature. At room temperature and below, the leakage current of silicon diode $D_1$ is so small that there is no change in collector current. Therefore, below 25° C. no compensation is needed. The desired result is accomplished with a sensitor and thermistor.

The ability of the circuit to operate at low direct current (50 milliwatts and up) is one of the biggest advantages. Also, it is possible to adjust for signal voltage threshold and voltage differential between operating modes. The circuit can be made compact enough to be used where space is at a premium. Of course, the temperature compensation from 0 to 80° C. and the positive action of the circuit are also advantageous.

The novelty of this circuit is the ability to operate with one polarity direct current signal voltage at very low level and still maintain a positive action circuit.

This circuit can be applied wherever a variable direct current threshold level is needed for control of relays or other circuits.

Figure 2:
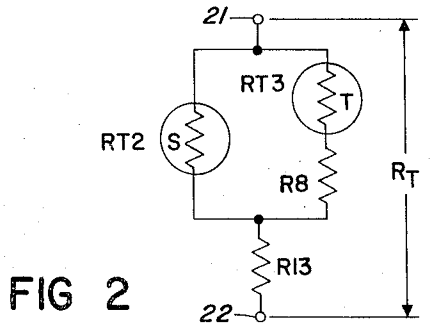
FIGURE 2 is a detailed view of the temperature compensating circuitry.
Figure 3:
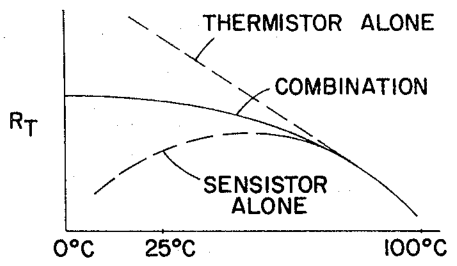
FIGURE 3 is a plot of resistance versus temperature for various components used in the circuit.

FIGURE 2 shows the temperature compensating circuit, and it is to be noted that the total resistance across terminals 21 and 22 produces a temperature characteristic such as shown in FIGURE 3 by the solid line, and the net effect of the resistance variations with temperature across terminals 21 and 22 is to compensate for the exponential temperature variation in the transistors Q1 and Q2. Thus the sensistor and transistor produce temperature compensation.

In order to adjust the switching point of the circuit the movable contact 12 is adjusted to a suitable level until switching occurs. So as to switch back upon the decrease of voltage applied to terminal 10, movable contact 13 may be adjusted.

The output at terminals 19 and 20 will be a voltage which is zero when transistor Q2 is not conducting and transistor Q1 is conducting. This condition exists when a positive direct current voltage has been applied to terminal 10. When this signal has been removed or has fallen below a predetermined level, Q1 will stop conducting and transistor Q2 will commence conducting and a voltage will be developed across the resistor R3 which is other than zero.

Although the invention has been described with respect to a particular embodiment thereof, it is not to be so limited, as changes and modifications may be made therein which are within the spirit and scope of the invention as defined by the appended claims.

I claim:

1. A switching circuit for low level threshold detection, comprising first and second transistors each having a base, a collector and an emitter, a first impedance means common to the emitter circuits of both said transistors, means for applying a voltage between the collector and the emitter of said second transistor to render said second transistor normally conducting, means for applying across said first impedance means a voltage of a polarity opposite to that produced in said first impedance means by the flow therethrough of the emitter current of said normally conducting second transistor, means for applying an input signal to the base of said first transistor to thereby render said first transistor conducting, means interconnecting the collector of said first transistor and the base of said second transistor to apply the voltage of the former to the latter to render said second transistor nonconducting upon the occurrence of conduction in said first transistor, second impedance means in the emitter circuit of said second transistor across which an output signal is developed, and a temperature compensating circuit in the collector circuit of said first transistor including a thermistor and a sensistor in parallel therewith.

2. A switching circuit comprising first and second transistors each having a base, a collector and an emitter, a variable bias voltage, means connecting said transistors to said variable bias voltage, a fixed bias voltage, said fixed bias voltage rendering said second transistor normally conducting, an input terminal for applying an input voltage to said first transistor, said input voltage rendering said first transistor conductive, an interconnection between the collector of said first transistor and the base of second transistor for rendering said second transistor nonconducting when said first transistor is conducting, and a temperature compensating circuit cooperating with said first transistor to compensate for the nonlinear temperature response of said transistor, said temperature compensating circuit comprising a thermistor and a sensistor in parallel.

3. The switching circuit of claim 2 including a second thermistor in parallel with said variable bias voltage.

4. The switching circuit of claim 2 including a resistor in series with said thermistor.

5. A switching circuit comprising a first normally nonconductive transistor and a second normally conductive transistor, an input terminal to said first transistor for rendering it conductive upon application of an input signal, means connecting the collector of said first transistor to the base of said second transistor for rendering said second transistor nonconductive when said first transistor is conductive and also for returning said first and second transistors to their normal states when said input signal is removed, variable bias means connected to the emitters of said first and second transistors, and a temperature compensating circuit including a thermistor and a sensistor in parallel for compensating for the nonlinear temperature response of said transistors.

6. A switching circuit comprising a first and a second transistor, the emitters of said transistors being connected to a first bias means, the collectors of said transistors being connected through a temperature compensating circuit and a first resistor in series with said compensating circuit, said compensating circuit comprising a thermistor and a second resistor in series, and a sensistor in parallel with said thermistor and said second resistor.

7. A temperature compensating circuit comprising a thermistor and a sensistor in parallel.

8. The circuit of claim 7 including a first resistor in series with said thermistor.

9. The circuit of claim 8 including a second resistor in series with the parallel combination of said thermistor and said sensistor.

References Cited by the Examiner

UNITED STATES PATENTS 2,914,685 11/1959 McVey ____________ 307—88.5

FOREIGN PATENTS 557,559 11/1943 Great Britain.

ARTHUR GAUSS, *Primary Examiner.*

J. BUSCH, *Assistant Examiner.*